United States Patent
Takaishi et al.

(10) Patent No.: US 12,205,330 B2
(45) Date of Patent: Jan. 21, 2025

(54) NON-TRANSITORY COMPUTER READABLE MEDIUM STORING PROGRAM, INFORMATION PROCESSING APPARATUS, AND INFORMATION PROCESSING METHOD

(71) Applicant: FUJIFILM Business Innovation Corp., Tokyo (JP)

(72) Inventors: Shinya Takaishi, Kanagawa (JP); Koichi Matsubara, Kanagawa (JP); Yuichi Nishikuni, Kanagawa (JP); Daichi Kurotsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 368 days.

(21) Appl. No.: 17/888,399

(22) Filed: Aug. 15, 2022

(65) Prior Publication Data
US 2023/0326080 A1 Oct. 12, 2023

(30) Foreign Application Priority Data
Mar. 25, 2022 (JP) ................................ 2022-050050

(51) Int. Cl.
*G06T 7/90* (2017.01)
*H04N 1/60* (2006.01)

(52) U.S. Cl.
CPC ............. *G06T 7/90* (2017.01); *H04N 1/6002* (2013.01); *G06T 2207/10024* (2013.01)

(58) Field of Classification Search
CPC ............ G06T 7/90; G06T 2207/10024; H04N 1/6002; H04N 1/6011; H04N 1/54; G03G 15/0105; G03G 15/5091
See application file for complete search history.

(56) References Cited

U.S. PATENT DOCUMENTS 8,830,526 B2 * 9/2014 Koyatsu ................. G06K 15/18
358/1.9
9,323,490 B2    4/2016 Yasutomi

FOREIGN PATENT DOCUMENTS

JP         2014194713         10/2014

* cited by examiner

*Primary Examiner* — Christopher Wait
(74) *Attorney, Agent, or Firm* — JCIPRNET (57) ABSTRACT

A non-transitory computer readable medium storing a program causing a computer, which reproduces a color tone of a printed matter and displays the color tone on a screen before printing, to realize a function of generating an image in which the color tone of the printed matter is reproduced based on a first component reflected by a metallic color material and a second component transmitted through the color material and reflected by paper.

9 Claims, 9 Drawing Sheets

| C | M | Y | K | METALLIC COLOR | R | G | B | GLOSSINESS |
|---|---|---|---|---|---|---|---|---|
| 0 | 0 | 0 | 0 | 0 | XXX | XXX | XXX | XXX |
| 0 | 0 | 0 | 0 | 12.5 | XXX | XXX | XXX | XXX |
| 0 | 0 | 0 | 0 | 25 | XXX | XXX | XXX | XXX |
| ... | ... | ... | ... | ... | ... | ... | ... | ... |
| 100 | 100 | 100 | 100 | 87.5 | XXX | XXX | XXX | XXX |
| 100 | 100 | 100 | 100 | 100 | XXX | XXX | XXX | XXX |

DENSITY VALUE | VALUE USED TO CALCULATE DISPLAY COLOR

APPEAR YELLOWISH GREEN
(BUT COLOR TONE CHANGES ACCORDING
TO DENSITY OF SILVER TONER)

◌ ABSORPTION  ◌ REFLECTION

FIG. 6B

COLORED PAPER DLUT[RGB] CORRESPONDING TO SPOT COLOR

$$= \underbrace{\frac{\text{REFLECTION}}{\text{COEFFICIENT}} \times \frac{\text{SPOT COLOR}}{C_{in}}}_{\substack{\text{EFFECT} \\ \text{OF COMPONENT REFLECTED} \\ \text{BY SPOT COLOR TONER}}} \times \underbrace{\text{WHITE PAPER DLUT [RGB]}}_{\substack{\text{APPEARANCE OF COLOR} \\ \text{IN CASE OF PRINTING} \\ \text{IS PERFORMED ON WHITE PAPER}}}$$

$$+ \underbrace{\left(1 - \frac{\text{REFLECTION}}{\text{COEFFICIENT}} \times \frac{\text{SPOT COLOR}}{C_{in}}\right)}_{\substack{\text{EFFECT OF COMPONENT REFLECTED} \\ \text{BY PAPER}}} \times \underbrace{\frac{\text{COLORED PAPER}}{\text{[RGB]}} \times \frac{\text{COLORED PAPER}}{\text{DLUT [RGB]}} / \frac{\text{WHITE PAPER}}{\text{[RGB]}}}_{\substack{\text{APPEARANCE OF COLOR IN CASE OF PRINTING} \\ \text{IS PERFORMED ON COLORED PAPER}}}$$

PREVIEW IMAGE IN CASE OF PRINTING IS PERFORMED ON WHITE PAPER

YELLOW

FIG. 8B

PREVIEW IMAGE IN CASE OF PRINTING IS PERFORMED ON BLUE PAPER

GREEN

FIG. 9C
PREVIEW IMAGE IN CASE OF PRINTING IS PERFORMED ON PAPER OF BLUE COLOR BY USING GOLD TONER AS BASE

FIG. 9B
PREVIEW IMAGE IN CASE OF PRINTING IS PERFORMED ON PAPER OF BLUE COLOR BY USING SILVER TONER AS BASE

YELLOWISH GREEN

FIG. 9A
PREVIEW IMAGE IN CASE OF PRINTING IS PERFORMED ON WHITE PAPER BY USING SILVER TONER AS BASE

LIGHT YELLOW

NON-TRANSITORY COMPUTER READABLE MEDIUM STORING PROGRAM, INFORMATION PROCESSING APPARATUS, AND INFORMATION PROCESSING METHOD

CROSS-REFERENCE TO RELATED APPLICATIONS

This application is based on and claims priority under 35 USC 119 from Japanese Patent Application No. 2022-050050 filed Mar. 25, 2022.

BACKGROUND

(i) Technical Field

The present invention relates to a non-transitory computer readable medium storing a program, an information processing apparatus, and an information processing method.

(ii) Related Art

Before printing, the color tone of an image to be printed may be confirmed on a screen. A preview function is used for the confirmation. By checking the color tone before printing, waste of paper and color materials is reduced.

In a field of color printing, four basic colors of Cyan (C), Magenta (M), Yellow (Y), and Black (K) are used. Nowadays, gold, silver, and other metallic colors may be used in addition to the basic colors.

SUMMARY

Today, paper of various colors is used for printing, and even in a case of printing the same image, different colors of paper may make the color tones of printed matters appear different. For example, in a case where printing is performed on paper of a white color (hereinafter, referred to as "white colored paper") and in a case where printing is performed on paper of a blue color, the same image appears with different color tones.

Therefore, in a case where the image of the printed matter is displayed by a preview function, a technique of correcting the appearance of the image of the printed matter in a case where printing is performed on the white colored paper with a coefficient determined according to the color of paper has been put into practical use.

On the other hand, the preview function according to the related art does not assume a case where color materials corresponding to gold, silver, and other metallic colors are printed on colored paper (hereinafter, referred to as "paper of a non-white color"). In fact, in a case where the metallic colors are displayed with the preview function according to the related art, there is a large difference from the appearance of an actual printed matter, unlike the case where printing is performed on the white colored paper. In particular, in a place where the density of the color material corresponding to the metallic color is high, the difference in appearance from the actual printed matter becomes large.

Aspects of non-limiting embodiments of the present disclosure relate to a non-transitory computer readable medium storing a program, an information processing apparatus, and an information processing method that improve the reproducibility of the color of the image of a printed matter displayed on a screen as compared with a case of reproducing the color tone of the image of the printed matter by considering only reflected light from paper.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing a program causing a computer, which reproduces a color tone of a printed matter and displays the color tone on a screen before printing, to realize a function of generating an image in which the color tone of the printed matter is reproduced based on a first component reflected by a metallic color material and a second component transmitted through the color material and reflected by paper.

BRIEF DESCRIPTION OF THE DRAWINGS

Exemplary embodiment(s) of the present invention will be described in detail based on the following figures, wherein:

FIGS. 6A and 6B are diagrams showing the effect of a metallic color on the color tone and the calculation algorithm of the colored paper DLUT.

FIGS. 8A and 8B are diagrams showing examples of the display of the preview image in a case where a spot color is not used, FIGS. 9A to 9C are diagrams showing examples of the display of the preview image in a case where the spot color is used.

DETAILED DESCRIPTION

Hereinafter, exemplary embodiments of the present invention will be described with reference to the accompanying drawings.

System Configuration

Figure 1:
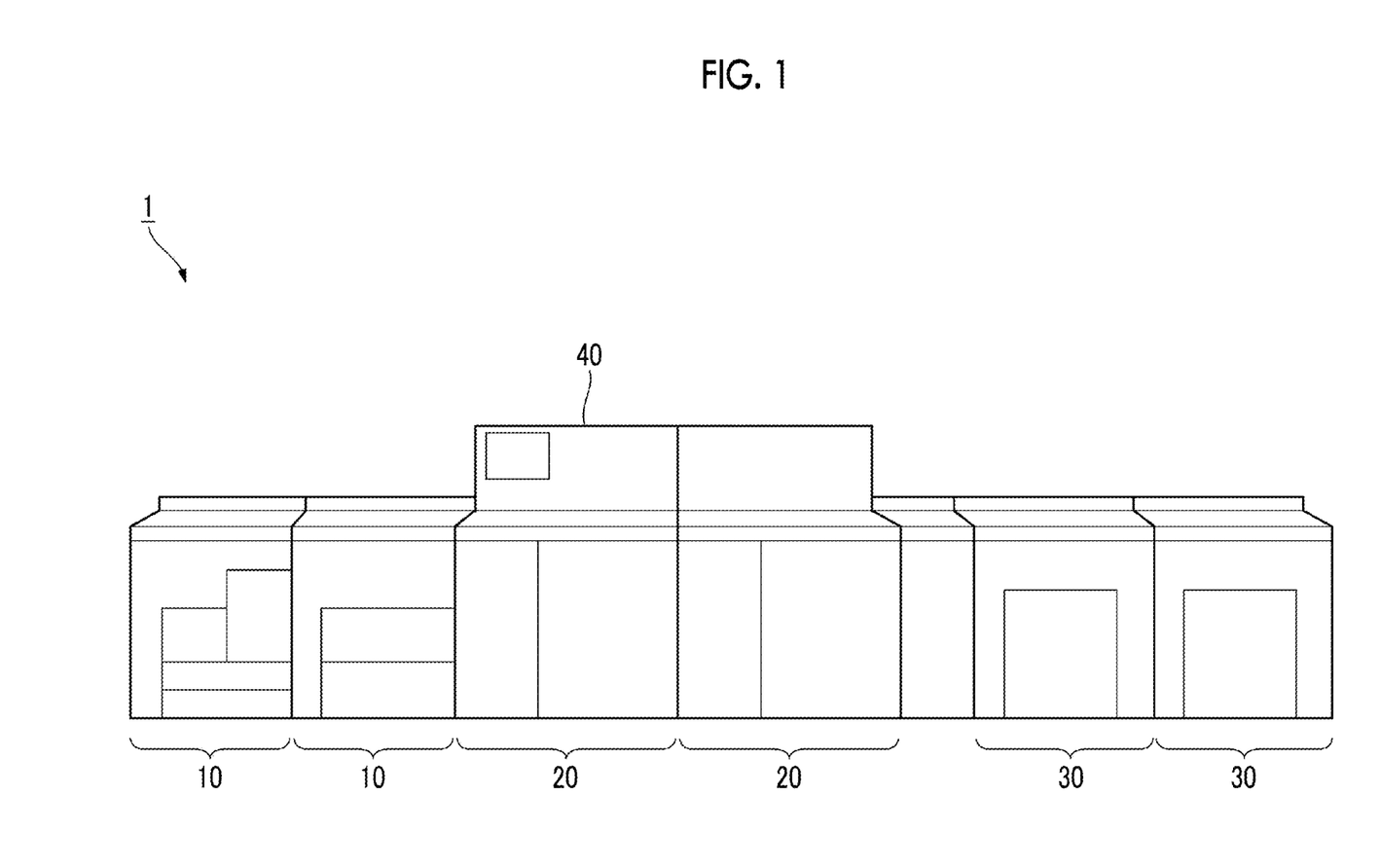
FIG. 1 is a diagram showing a configuration example of a printing system used in an exemplary embodiment.

FIG. 1 is a diagram showing a configuration example of a printing system 1 used in an exemplary embodiment.

The printing system 1 shown in FIG. 1 includes a paper feeding device 10, a printing device 20, a post-processing device 30, and a control device 40.

Here, the printing system 1 is an example of an image forming system, the printing device 20 is an example of an image forming apparatus, and the control device 40 is an example of an information processing apparatus.

The printing system 1 shown in FIG. 1 is also called a production printer. First of all, the printing system 1 is not limited to the production printer, and may be a printer used in an office or a printer used at home. In addition to a print function, a scanner function, a fax transmission/reception function, and the like are provided in the printer used in the office. The difference between the printer used in the office and the printer used at home is mostly performance.

In the printing system 1 shown in FIG. 1, two paper feeding devices 10 are connected in series.

The paper feeding device 10 is a device that supplies paper to the printing device 20. In a case of the present exemplary embodiment, the paper feeding device 10 contains cut paper. The paper feeding device 10 contains, for example, 7,000 sheets of cut paper. First of all, the paper contained in the paper feeding device 10 is not limited to the cut paper, and may be roll paper. In the case of the present exemplary embodiment, the paper is not limited to so-called white colored paper (hereinafter, also referred to as "white paper"), and it is assumed that colored paper (hereinafter, referred to as a "paper of a non-white color") is used.

The non-white colored paper in the present exemplary embodiment is not limited to a case where the entire paper is a single color. For example, the paper may contain a plurality of colors.

Further, the non-white colored paper is not limited to dyed paper, and also includes paper whose surface is only colored. Therefore, paper, which has a surface that is a lower layer of a metallic color and printed with any color, may be included in the non-white colored paper in a broad sense. The paper here is an example of a recording medium.

In the printing system 1 shown in FIG. 1, two printing devices 20 are connected in series. The printing device 20 in the present exemplary embodiment has an engine (hereinafter, also referred to as a "printing engine") for printing an image on paper by an electrophotographic method.

The printing engine prints an image on paper through charging, exposing, developing, transferring, and fixing steps. The printing engine is an example of a forming unit that forms an image on paper using a plurality of color materials. The image is not limited to so-called a figure and a photograph, and may include text. In the following, a figure and a photograph formed on the surface of paper are also referred to as objects.

The printing device 20 used in the present exemplary embodiment is an apparatus capable of printing using four types of toners corresponding to the basic colors and one or two types of toners corresponding to the metallic color.

In the present exemplary embodiment, gold, silver, and other metallic colors are assumed. The metallic color is also called, for example, a color having a higher reflection coefficient to natural light than the basic colors. The metallic color may be called a "spot color" because the metallic color is a color other than the basic colors.

The toner used in the printing device 20 is an example of the color material.

The printing device 20 in the present exemplary embodiment has a function of printing on both sides of the paper in addition to the function of printing on one side of the paper. The paper on which the image is printed is called a printed matter.

In the printing system 1 shown in FIG. 1, two post-processing devices 30 are connected in series. The post-processing device 30 is provided with, for example, a process of discharging the printed matter on the same page as a unit by shifting a position (that is, a stack process), a staple process of filing a plurality of sheets of paper with a staple, and a process of binding a plurality of sheets of paper with an adhesive tape.

The control device 40 is a device that controls the movement of the printing device 20 and the like. The control device 40 controls, for example, generation of a Direct Look Up Table (DLUT), scanning of the DLUT, management of a print job or document data used for printing, and a Raster Image Processer (RIP) process.

The DLUT is a table in which the density value of each toner color is associated with a value used for calculating each display color. The DLUT is an example of a conversion table.

The control device 40 also controls the generation of a preview image that reproduces the color tone of the printed matter before printing by using the above-described DLUT.

In the case of FIG. 1, the control device 40 is disposed at the upper part of the housing of the printing device 20, but may be disposed in the housing of the printing device 20.

The print job indicates a job instructing to print a document. One print job includes a data file corresponding to a document to be printed (hereinafter, also referred to as the "document data"). The data format of the document data does not matter.

The document data includes an electronic document generated by an application program (hereinafter, referred to as an "application") and a digitized document generated from a paper document.

The electronic document includes, for example, electronic data generated by so-called an office application, electronic data generated by a drawing application, electronic data generated by an accounting application, and a web page displayed in a website browsing application (that is, a browser).

The digitized document includes, for example, electronic data output from a scanner and electronic data output from a camera.

The document data in the present exemplary embodiment includes an object such as a figure and text, and a color is set for each object. The color of the object is given by, for example, each density value of Cyan (C), Magenta (M), Yellow (Y), and Black (K), and the metallic color.

The density value in the present exemplary embodiment is represented by, for example, 0% to 100% or 0 to 255. 0% or 0 indicates the minimum density value, and 100% or 255 indicates the highest density value.

Configuration of Control Device

Figure 2:
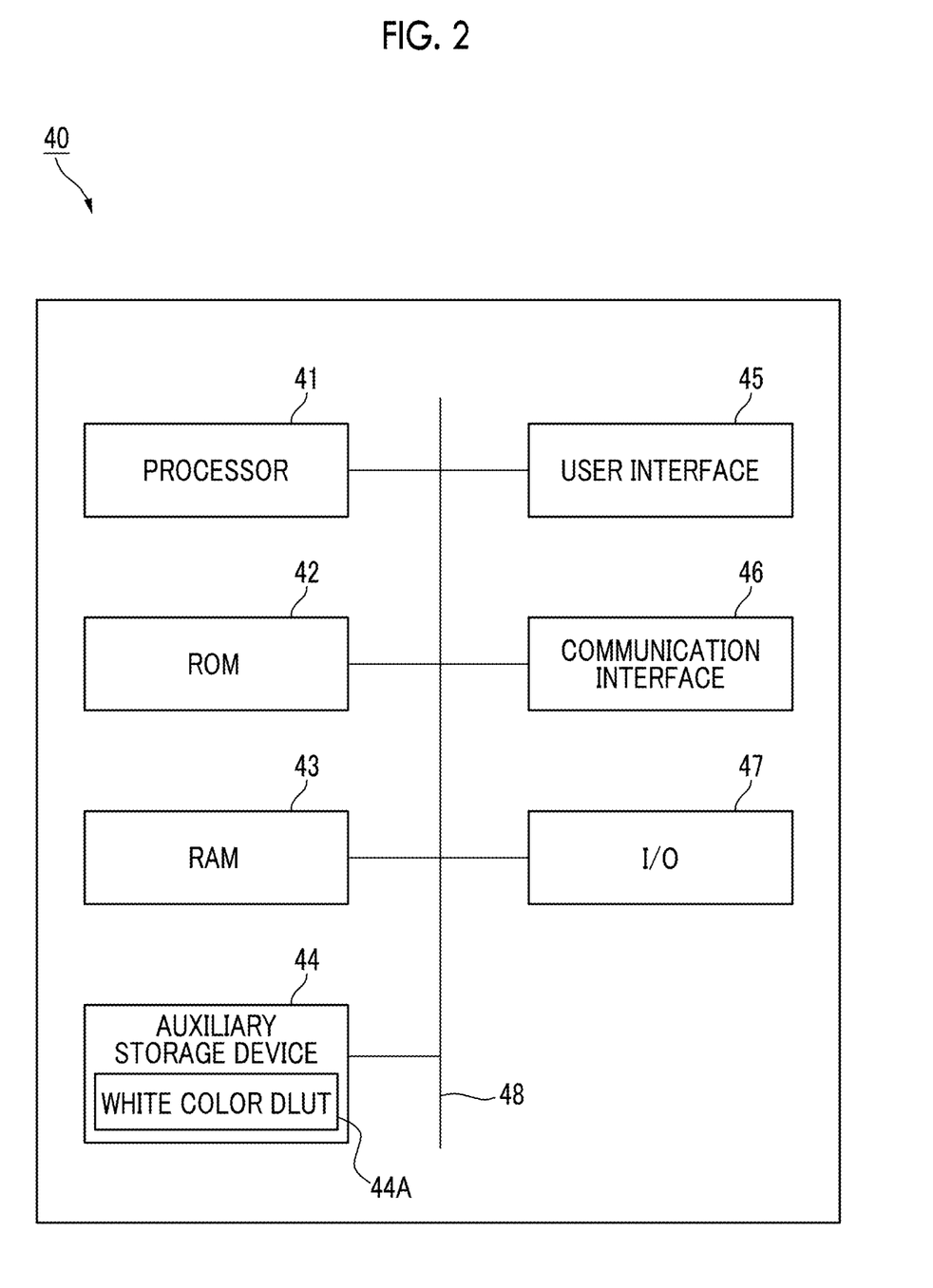
FIG. 2 is a diagram showing an example of a hardware configuration of a control device.

FIG. 2 is a diagram showing an example of the hardware configuration of the control device 40.

The control device 40 shown in FIG. 2 includes a processor 41, a Read Only Memory (ROM) 42 in which a Basic Input Output System (BIOS) and the like are stored, a Random Access Memory (RAM) 43 used as a work area of the processor 41, an auxiliary storage device 44, a user interface 45, a communication interface 46, and an I/O 47. Each unit of the control device 40 is connected through a bus or another signal line 48.

The processor 41 is a device that realizes various functions through the execution of a program.

The processor 41 in the present exemplary embodiment realizes the various functions through the execution of the program. The processor 41, the ROM 42, and the RAM 43 function as a computer.

The auxiliary storage device 44 is, for example, a hard disk device or a semiconductor storage. The auxiliary storage device 44 is used for storing the program, a print job, and the like. The program is used as a general term for an Operating System (OS) and an application program.

In addition, the auxiliary storage device 44 stores a DLUT (hereinafter, referred to as a "white color DLUT") 44A in which the density value of each color given by the document data is converted into a display color observed in a case where printing is performed on paper of a white color.

Figure 3:
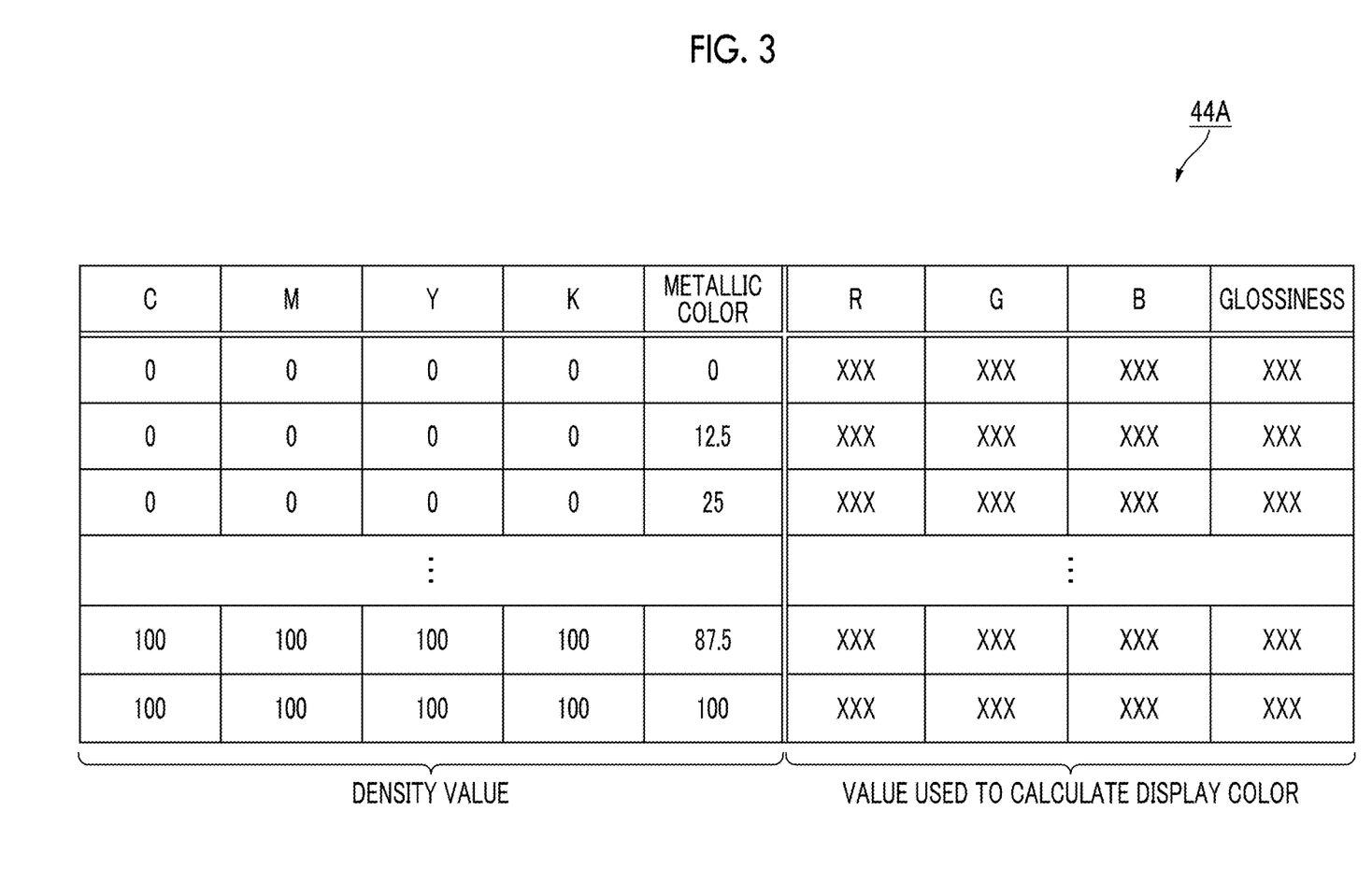
FIG. 3 is a diagram showing an example of a data structure of a white color DLUT.

FIG. 3 is a diagram showing an example of the data structure of the white color DLUT 44A.

The left column of the data structure corresponds to the density value defined in the document data, and the right column corresponds to the value used for calculating the display color.

In the case of FIG. 3, the density value is given by Cyan (C), Magenta (M), Yellow (Y), and Black (K), and the metallic color.

On the other hand, the value used for calculating a display value is given by each gradation value of R (red), G (green), and B (blue) and glossiness. The gradation value may be called a "signal value". The gradation value is expressed by, for example, 0 to 255. 0 is the minimum value and 255 is the maximum value. The glossiness is expressed by, for example, 0% to 100%. 0% is the minimum value and 100% is the maximum value.

In FIG. 3, specific numerical values are omitted.

Returning to the description of FIG. 2.

The user interface 45 is an interface that accepts an operation of a user who uses the printing device 20. The user interface 45 has, for example, an input unit such as a button for operation and a touch sensor for detecting an operation by a user's fingertip, and a display unit such as a liquid crystal display or an organic Electro-Luminescent (EL) display.

The communication interface 46 is an interface for communicating with another terminal or the like. A wired or wireless communication method is used as the communication method of the communication interface 46. For example, ETHERNET (registered trademark), Wi-Fi (registered trademark) and the like are used as the communication standard of the communication interface 46.

The I/O 47 is a device used for communication between the processor 41, the printing device 20 (see FIG. 1), and the like.

Figure 4:
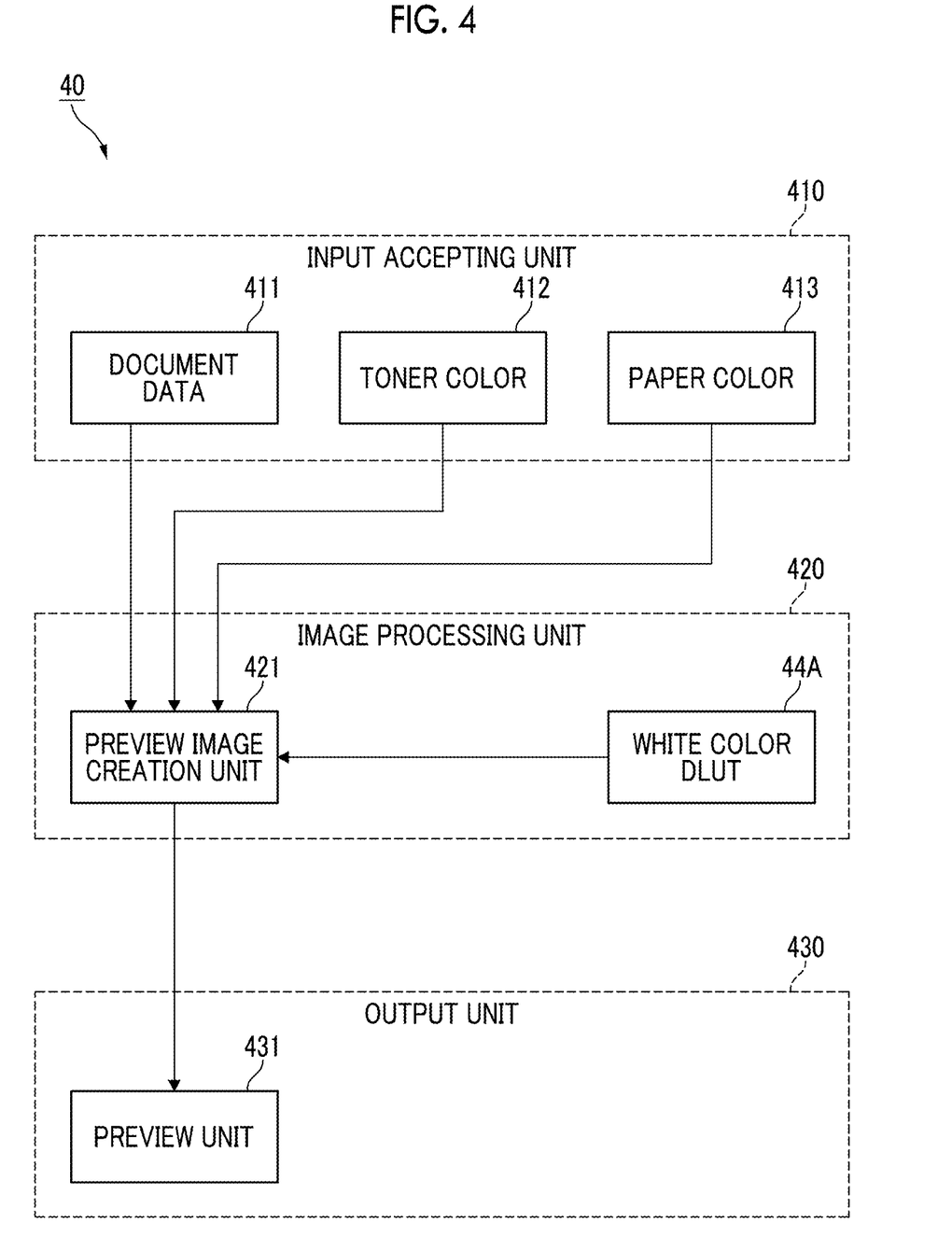
FIG. 4 is a diagram showing an example of a functional configuration of the control device.

FIG. 4 is a diagram showing an example of the functional configuration of the control device 40. The functional units shown in FIG. 4 are realized through the execution of the program by the processor 41 (see FIG. 2).

The functional units shown in FIG. 4 are schematically classified as an input accepting unit 410, an image processing unit 420, and an output unit 430.

The input accepting unit 410 is a functional unit that accepts information necessary for predicting the color tone of the printed matter.

In a case of FIG. 4, the input accepting unit 410 accepts the inputs of document data 411, a toner color 412, and a paper color 413. The document data 411 is, for example, a color chart in which a plurality of colors having different color tones are arranged in a matrix. The toner color 412 indicates a toner color that can be used as a color material by the printing device 20. The toner color 412 is given, for example, by Cyan (C), Magenta (M), Yellow (Y), and Black (K), and the metallic color. The metallic color is, for example, a silver color. The paper color 413 is the color of the paper housed in the paper feeding device 10 (see FIG. 1), and is given by a density value of, for example, Cyan (C), Magenta (M), Yellow (Y), and Black (K).

The image processing unit 420 is a functional unit that generates a preview image that predicts the color tone of the printed matter.

In the case of FIG. 4, the image processing unit 420 includes a preview image creation unit 421 and a white color DLUT 44A.

The preview image creation unit 421 is a functional unit that executes creation of a color conversion table (hereinafter, referred to as a "colored paper DLUT") that reproduces a color tone observed in a case of printing an object on the surface of the non-white colored paper, and creation of the preview image.

The preview image creation unit 421 in the present exemplary embodiment creates the colored paper DLUT using the document data 411, the toner color 412, the paper color 413, and the white color DLUT 44A.

The created colored paper DLUT is stored in the auxiliary storage device 44 (see FIG. 2).

The output unit 430 is a functional unit that displays the preview image for predicting the color tone of the printed matter on the display unit.

In the case of FIG. 4, the output unit 430 is configured with a preview unit 431. The preview unit 431 converts the color of the object designated in the document data 411 into a color that reproduces the appearance in a case where printing is performed on the non-white colored paper and displays the color on the display unit by referring to the white paper DLUT and the colored paper DLUT. The preview image in the present exemplary embodiment is previewed in three dimensions.

Calculation Algorithm of Colored Paper DLUT

In the following, the calculation algorithm of the colored paper DLUT will be described with reference to FIGS. 5 to 6B.

Figure 5:
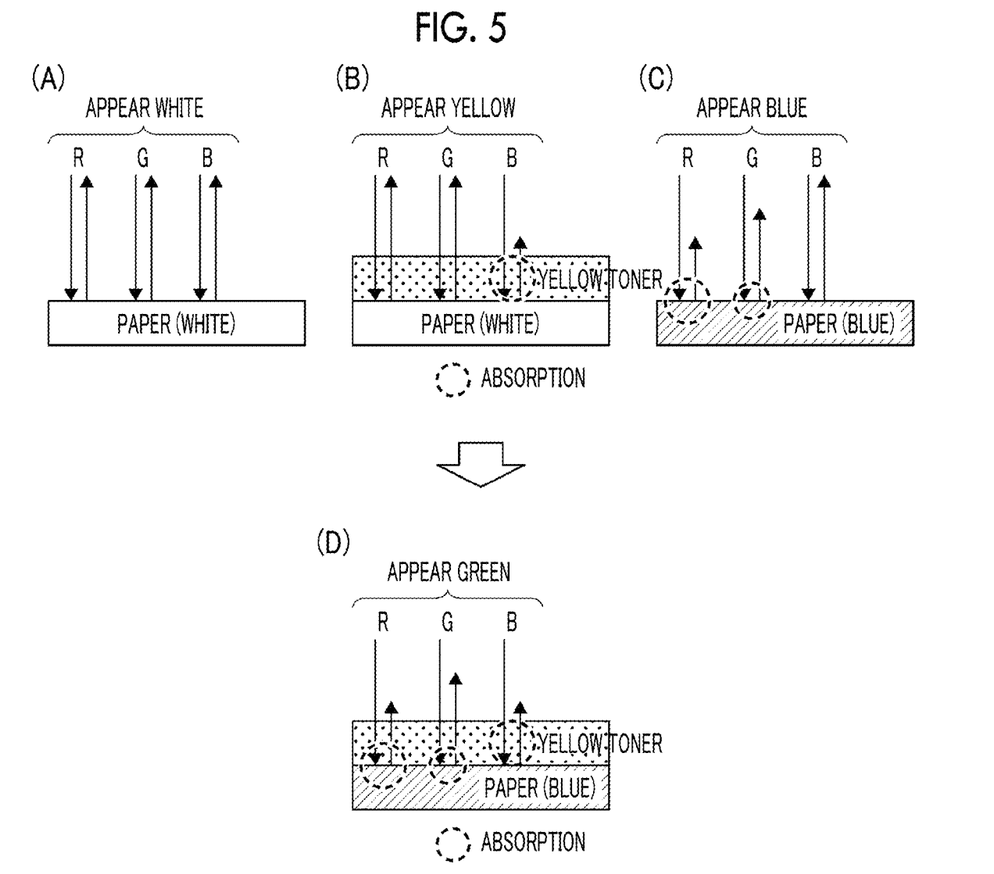
FIG. 5 is a diagram explaining a color recognition mechanism and a calculation algorithm of a colored paper DLUT, a part (A) of FIG. 5 is a diagram explaining the appearance of paper of a white color, a part (B) of FIG. 5 is a diagram explaining the appearance of the color tone of a part printed with a yellow toner on the surface of the paper of a white color, a part (C) of FIG. 5 is a diagram explaining the appearance of paper of a blue color, a part (D) of FIG. 5 is a diagram explaining the appearance of the color tone of a part printed with the yellow toner on the surface of the paper of a blue color, and a part (E) of FIG. 5 is a diagram explaining a calculation algorithm of the colored paper DLUT assuming a case where printing is performed using basic colors on the paper of a blue color.

FIG. 5 is a diagram explaining a color recognition mechanism and a calculation algorithm of a colored paper DLUT. A part (A) of FIG. 5 is a diagram explaining the appearance of the paper of a white color, a part (B) of FIG. 5 is a diagram explaining the appearance of the color tone of a part printed with a yellow toner on the surface of the paper of a white color, a part (C) of FIG. 5 is a diagram explaining the appearance of paper of a blue color, a part (D) of FIG. 5 is a diagram explaining the appearance of the color tone of a part printed with the yellow toner on the surface of the paper of a blue color, and a part (E) of FIG. 5 is a diagram explaining a calculation algorithm of the colored paper DLUT assuming a case where printing is performed using basic colors on the paper of a blue color.

In each of the parts (A) to (D) of FIG. 5, incidents and reflections of R (red), G (green), and B (blue) as natural light are represented by arrows.

A downward arrow indicates incident light, and an upward arrow indicates reflected light. The length of the arrow indicates the intensity of light.

In the part (A) of FIG. 5, the intensity of the light component incident on the paper of a white color and the intensity of the light component reflected by the paper of a white color are substantially the same. Therefore, R (red), G (green), and B (blue) are mixed and appears white.

By the way, the component of B (blue) has a property of being absorbed by the yellow toner. Therefore, in the part (B) of FIG. 5, only the intensity of the component of the reflected light of B (blue) is reduced. As a result, the component of R (red) and the component of G (green) are mixed and appear yellow.

In FIG. 5, the difference in the amount of absorbed components is represented by the size of a circle.

On the other hand, in the part (C) of FIG. 5, only for the component of B (blue), the light component, which is the same as in the incidents, is reflected by the paper of a blue color, and a part of the components of the R (red) and G (green) is absorbed by the paper of a blue color. As shown in the part (C) of FIG. 5, B (blue) is dominant in the reflected light from the paper of a blue color. As a result, the paper of a blue color will appear blue.

The component of R (red) has a larger amount of absorption on paper of a blue color than the component of G (green). Therefore, a circle representing the absorption of the component of R (red) in the part (C) of FIG. 5 is larger than a circle representing the absorption of the component of G (green), and the length of an arrow representing the intensity of the reflected light of the component of R (red) is shorter than that the component of G (green).

The part (D) of FIG. 5 shows a mechanism that appears greenish in a case where the yellow toner is printed on the paper of a blue color. As shown in the part (D) of FIG. 5, the absorption described in the part (C) of FIG. 5 occurs for the components of R (red) and G (green), and the absorption described in the part (B) of FIG. 5 occurs for the component of B (blue).

As a result, the component of the reflected light transmitted through the yellow toner and is output to the outside is dominated by the component of G (green). Therefore, the paper appears greenish.

The part (E) of FIG. 5 shows a calculation expression of the colored paper DLUT used for the display of the preview image in a case where printing is performed on non-white colored paper using the basic colors.

colored paper $DLUT[RGB]$=colored paper$[RGB]\times$ white paper $DLUT[RGB]$/white paper $[RGB]$ The colored paper[RGB] is a signal value of a display color in a case where a metallic color is printed on the non-white colored paper, and is given by an RGB value. The white paper [RGB] is a signal value of a display color in a case where a metallic color is printed on the white paper, and is given by the RGB value.

In a case where the white paper is used for printing, the same value appears in a numerator and a denominator, so the formula is only for white paper DLUT[RGB].

A denominator value is used to normalize the effect of absorption on the non-white colored paper as a relative value to the paper of a white color.

[RGB] in the part (E) of FIG. 5 corresponds to R (red), G (green), and B (blue) which are the display colors of the preview image.

Figure 6A:
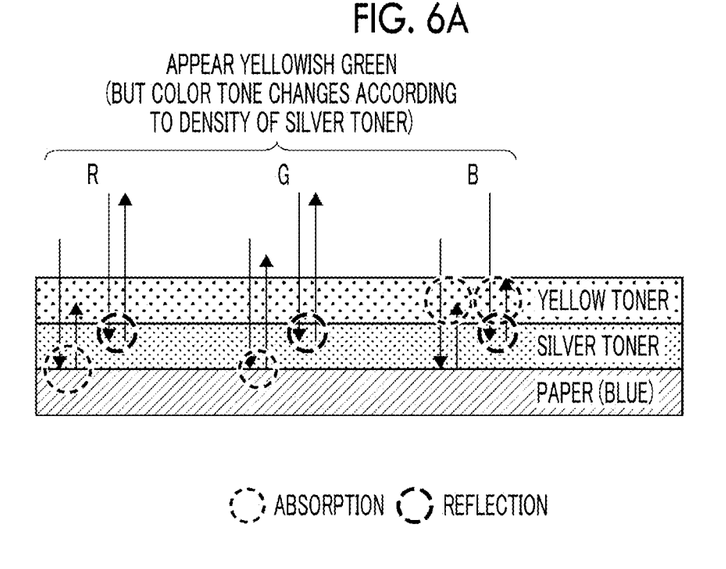
FIG. 6A is a diagram explaining the appearance of the color tone of a part where a silver toner and the yellow toner are printed in order on the surface of paper of a blue color.
Figure 6B:
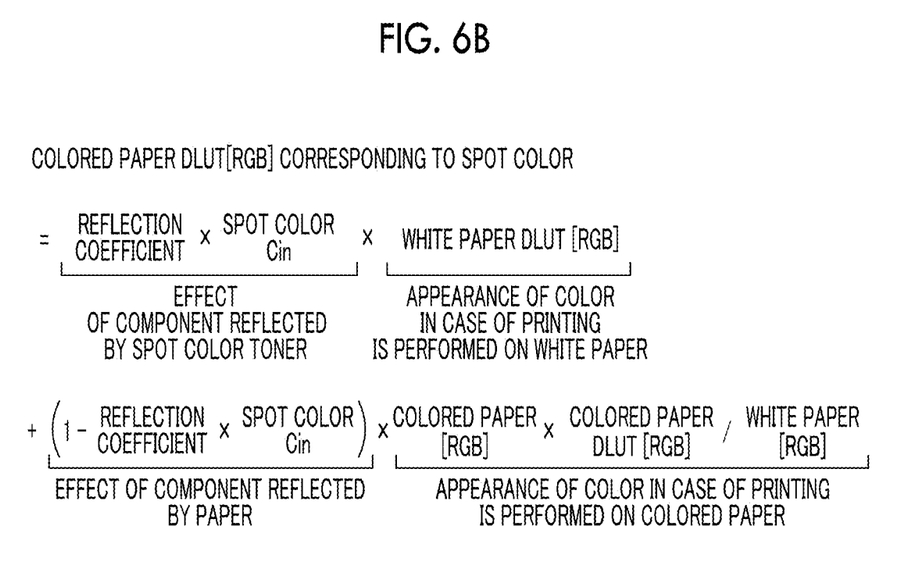
FIG. 6B is a diagram explaining the calculation algorithm of colored paper DLUT assuming a case where printing is performed on the paper of a blue color using the basic colors and the metallic color.

FIGS. 6A and 6B are diagrams showing the effect of the metallic color on the color tone and the calculation algorithm of the colored paper DLUT. FIG. 6A is a diagram explaining the appearance of the color tone of a part where a silver toner and the yellow toner are printed in order on the surface of paper of a blue color, and FIG. 6B is a diagram explaining the calculation algorithm of colored paper DLUT assuming a case where printing is performed on the paper of a blue color using the basic colors and the metallic color.

Even in a case where the density value of the silver toner or other metallic colors is maximum, as shown in FIG. 6A, there is a component that is transmitted through the silver toner and reflected on the surface of the paper. One of the reasons is that a metallic color toner, such as the silver toner, does not completely cover the surface of the paper.

The ratio of the toner per unit area covering the surface of paper is also called an "area ratio". The area ratio is proportional to the density value of each toner. That is, the higher the density value, the larger the area ratio, and the smaller the density value, the smaller the area ratio.

FIG. 6A shows a structure in which the layer of the silver toner is formed on the surface of the paper of a blue color and the layer of the yellow toner is further formed on the surface of the paper of a blue color.

As described above, the metallic color is a color material having a higher reflection coefficient than the basic colors.

Therefore, FIG. 6A shows an arrow representing a component reflected on the surface of the paper and an arrow representing a component reflected by the silver toner.

The pair of arrows on the left side of each color represents a component that transmits through the silver toner and is reflected on the surface of the paper of a blue color. This component is an example of a second component.

On the other hand, the pair of arrows on the right side of each color represents a component that is reflected by the silver toner. This component is an example of a first component.

Of these, the reflection of each component on the surface of the paper of a blue color is the same as in the part (C) of FIG. 5. That is, a part of the components of R (red) and G (green) is absorbed by the paper of a blue color. Therefore, the intensity of the component in which the components of R (red) and G (green) are reflected on the surface of the paper is smaller than the intensity of the incident component.

On the other hand, in the reflection on the surface of the silver toner, the effect of absorption is ignored. Therefore, the intensity of the component reflected by the silver toner is basically the same as the intensity of each component at the time of incident.

The higher the density of the silver toner, the more the component of light reflected by the silver toner and the less the component of light that is relatively transmitted through the silver toner and reflected on the surface of the paper of a blue color that is the base. In other words, the lower the density of the silver toner, the smaller the component of light reflected by the silver toner and the larger the component of light that is relatively transmitted through the silver toner and reflected on the surface of the paper of a blue color.

By the way, the component of B (blue) is also reflected on both the surface of the paper of a blue color and the surface of the silver toner.

The component of B (blue) reflected on the surface of the paper of a blue color is transmitted through the silver toner, and a part of the component of B (blue) is absorbed by the yellow toner. This absorption is similar to the part (D) of FIG. 5. Therefore, the length of the arrow representing the intensity of the component of B (blue) reflected on the surface of the paper of a blue color is short compared to a case of incident.

By the way, the part of the component of B (blue) is also reflected on the surface of the silver toner. Since the case is related to reflection, the deterioration in intensity due to the reflection is not taken into consideration. On the other hand, the part of the component of B (blue) reflected by the silver toner is also absorbed by the yellow toner.

As a result, the intensity of the component of B (blue) that is transmitted through the yellow toner and is output to the outside is lower than the intensities of the components of R (red) and G (green).

That is, the component of light reflected by the paper of a blue color is close to the part (D) of FIG. 5, and the component of light reflected by the silver toner is close to the part (B) of FIG. 5.

Therefore, in the portion where the silver toner is formed on the surface of the paper of a blue color and the yellow toner is formed on the surface, the intermediate color between the part (B) of FIG. 5 and the part (D) of FIG. 5, that is, a yellowish green appearance is obtained.

FIG. 6B shows the calculation algorithm.

FIG. 6B shows the calculation expression of the colored paper DLUT used for the display of the preview image in a case where printing is performed on the non-white colored paper using the basic colors and the spot color.

> colored paper $DLUT[RGB]$ corresponding to spot color=reflection coefficient×spot color $Cin$× white paper $DLUT\ [RGB]$+(1−reflection coefficient×spot color $Cin$)×colored paper$[RGB]$× colored paper $DLUT[RGB]$/white paper$[RGB]$ The first term here corresponds to the component of light reflected by a spot color toner, and the second term corresponds to the component of light reflected by the paper.

> In the first item, the part of "reflection coefficient× spot color $Cin$" represents the magnitude of the effect of the component reflected by the spot color toner.

The spot color here is a metallic color such as silver or gold.

The reflection coefficient is the reflection coefficient of the spot color used for printing. The reflection coefficient is set to a value of 0 or more and 1 or less.

Cin is the density value of the spot color. The density value is also a value of 0 or more and 1 or less. 0 is the minimum density and 1 is the maximum density. The density value here is a value obtained by normalizing the density value in FIG. 3. That is, the density value is a value obtained by dividing each density value by 100, which is the maximum value of the density value.

Therefore, even in a case of the same density value, the larger the reflection coefficient, the larger the value of "reflection coefficient×spot color Cin". Even in a case of the same reflection coefficient, the larger the density value, the larger the value of "reflection coefficient×spot color Cin". That is, the effect of the component reflected by the spot color toner becomes large.

In the first term, the part of the white paper DLUT[RGB] represents the appearance of a color in a case where printing is performed on the white paper.

The second term is an equation for calculating the effect of the colored paper DLUT that reproduces the color tone in a case where the basic colors described in the part (E) of FIG. 5 is printed on the non-white colored paper on the overall color tone.

> In the second term, the part of "1−reflection coefficient×spot color $Cin$" is a coefficient that gives a proportional ratio with the first term.

> In other words, the larger the value of "reflection coefficient×spot color $Cin$", the smaller the value of "1−reflection coefficient×spot color $Cin$".

> Here, in a case where "reflection coefficient×spot color$^+Cin$" is denoted by a, it is possible to write that colored paper $DLUT[RGB]$ corresponding to spot color=α×white paper $DLUT[RGB]$+(1−α)×colored paper $DLUT[RGB]$.

α is a value of 0 or more and 1 or less.

That is, the higher the density of the spot color toner, the greater the effect of the first component scanned by the white paper DLUT than the second component to be combined, and the lower the density of the spot color toner, the greater the effect of the second component scanned by the colored paper DLUT than the first component to be combined.

In other words, the ratio of the second component to be combined to the first component is inversely proportional to the magnitude of the density value of the spot color toner.

(R, G, B, and gloss) scanned by the white paper DLUT is an example of the first component, and (R, G, B, and gloss) scanned by the colored paper DLUT is an example of the second component.

Example of Processing Operation

Figure 7:
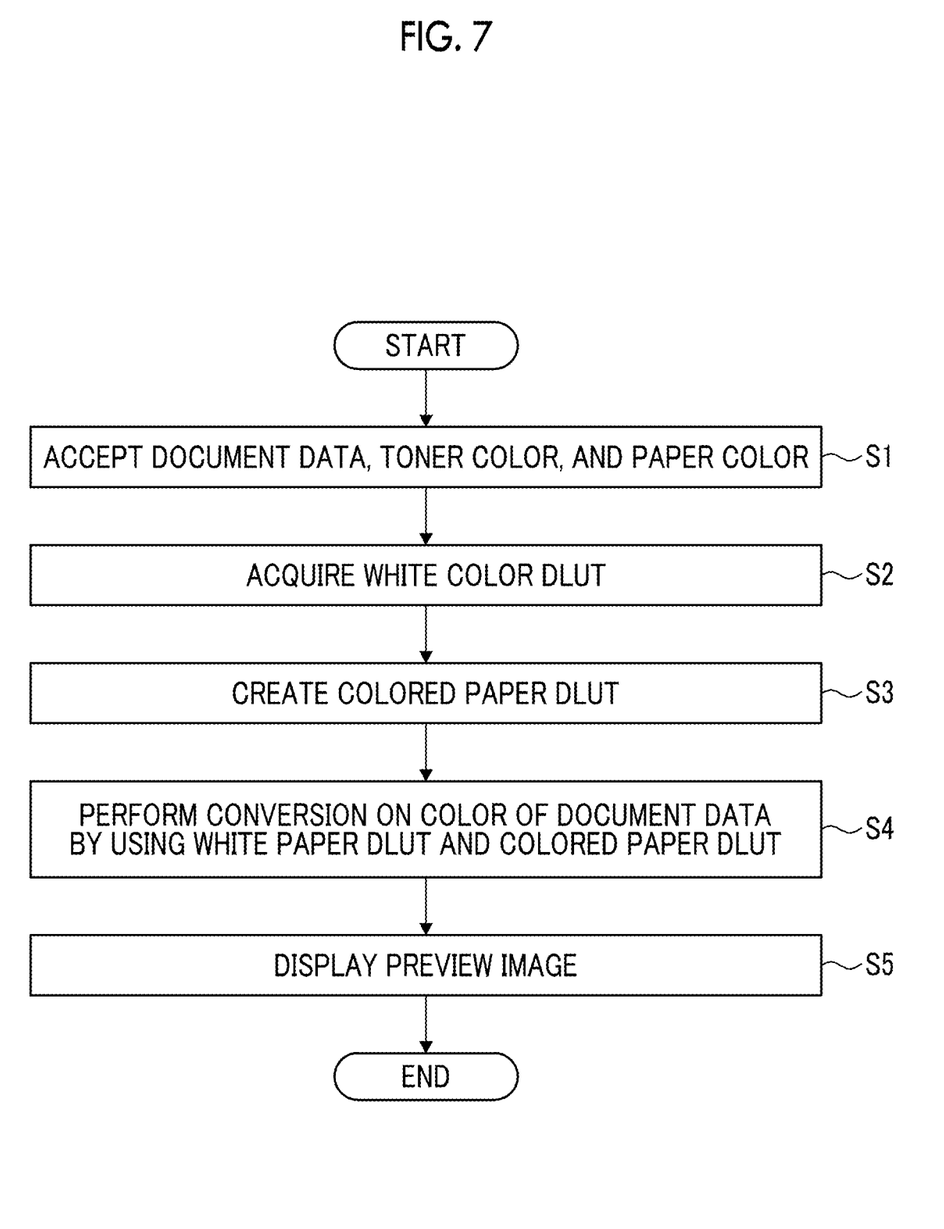
FIG. 7 is a flowchart showing an example of a processing operation related to the display of a preview image by the control device.

FIG. 7 is a flowchart showing an example of a processing operation related to the display of the preview image by the control device 40. The symbol S shown in the drawing indicates a step.

The processing operation shown in FIG. 7 is controlled through the execution of a program by the processor 41 (see FIG. 2).

The processing operation shown in FIG. 7 is started in a case where the processor 41 accepts, for example, the display of a preview image that reproduces the color tone of the printed matter before printing.

First, the processor 41 accepts the document data, the toner color, and the paper color. The toner color is a toner color that can be actually used by the printing device 20 (see FIG. 1). As described above, the toner color has the basic colors and a spot color. In the present exemplary embodiment, the metallic color is assumed as the spot color. The color of the paper used for printing the document data is applied to the paper color.

Next, the processor 41 acquires a white color DLUT (step S2). The white color DLUT is required for creating the preview image of the printed matter that does not use the spot color toner and for creating the preview image of the printed matter that uses the spot color toner.

In a case of acquiring the white color DLUT, the processor 41 creates the colored paper DLUT (step S3). The colored paper DLUT can be calculated according to the part (E) of FIG. 5.

Next, the processor 41 performs conversion on the color of the document data using the white paper DLUT and the colored paper DLUT (step S4). The conversion here is realized by a calculation expression shown in FIG. 6B.

Finally, the processor 41 displays the preview image created by using the paper color accepted in step S1 and the color calculated in step S4 (step S5).

In the present exemplary embodiment, the preview image is displayed on the display unit of the control device 40.

Example of Display of Preview Image

Figure 8A:
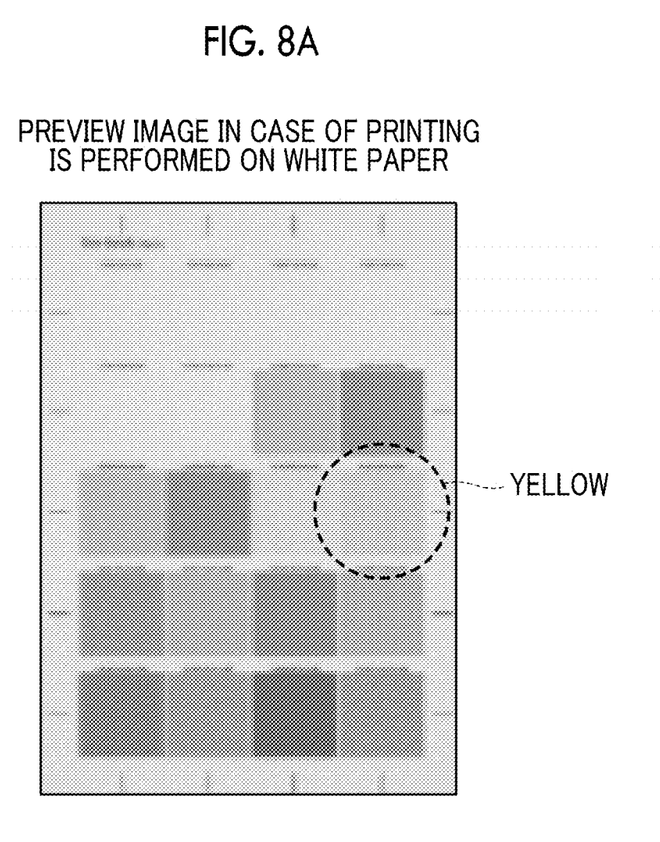
FIG. 8A shows an example of the preview image in a case where printing is performed on white paper.
Figure 8B:
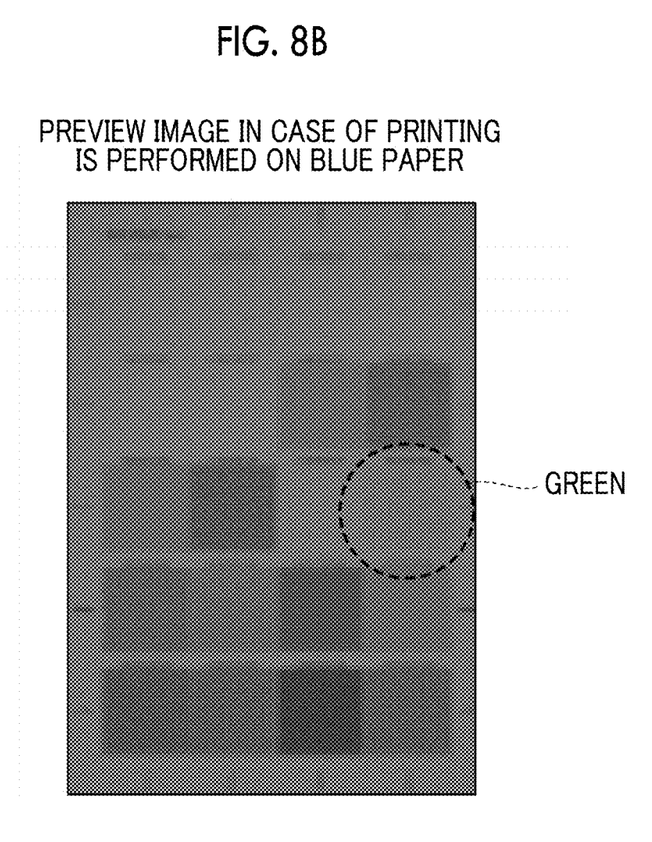
FIG. 8B shows an example of the preview image in a case where printing is performed on blue paper.

FIGS. 8A and 8B are diagrams showing examples of the display of the preview image in a case where the spot color is not used. FIG. 8A shows an example of the preview image in a case where printing is performed on white paper, and FIG. 8B shows an example of the preview image in a case where printing is performed on blue paper.

In FIGS. 8A and 8B, a case is assumed where the same color chart is printed on the paper.

In a case of FIG. 8A, since the paper is a white color, the color of the color patch is reproduced with almost the input value. Therefore, the color patch in a third row and a fourth column is displayed as a yellow color.

On the other hand, in a case where the paper has a blue color, as described with reference to the part (D) of FIG. 5, the amount of absorption of the component of R (red) and the component of B (blue) is large in the yellow toner. As a result, in FIG. 8B, the color patch in a third row and a fourth column is expressed as green.

Figure 9A:
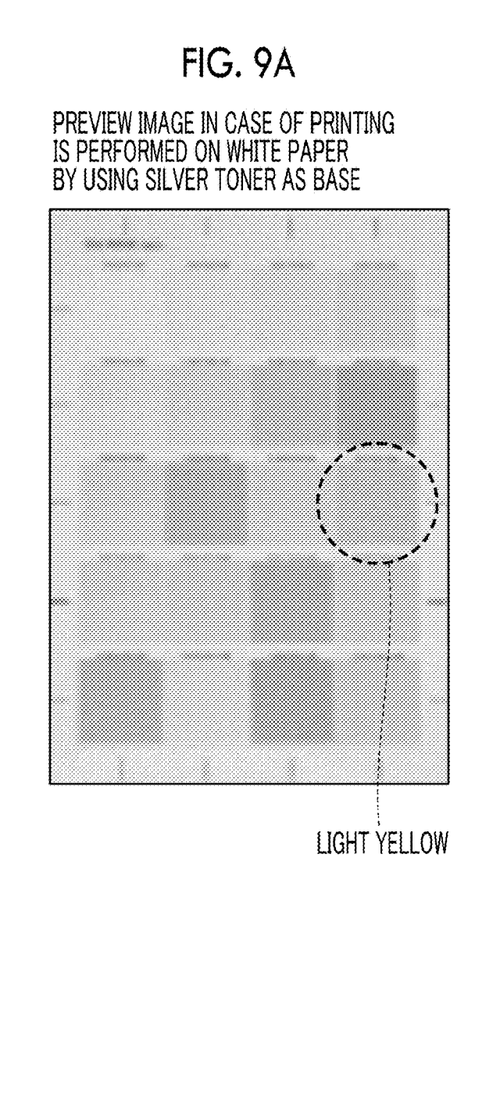
FIG. 9A shows an example of the preview image in a case where printing is performed on the white paper using the silver toner as a base.
Figure 9B:
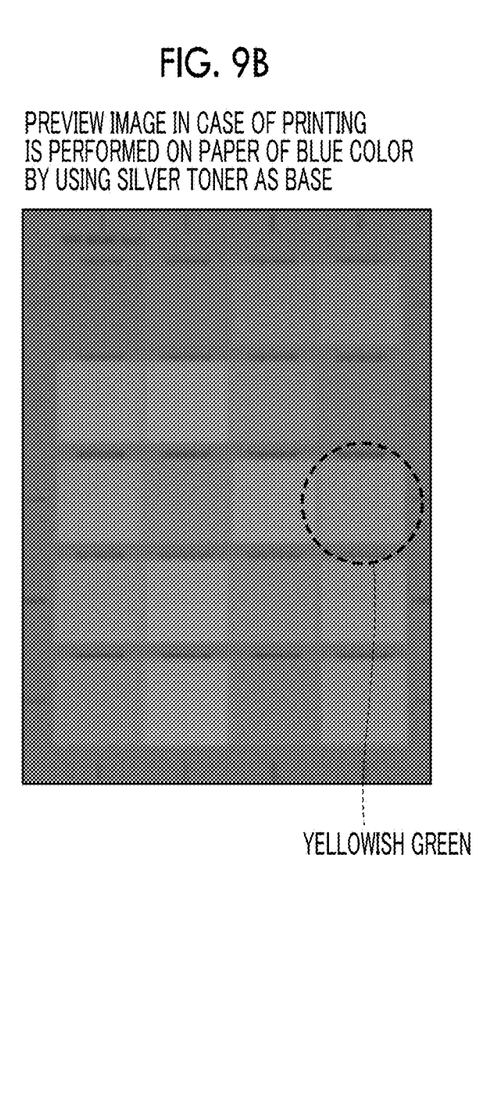
FIG. 9B shows an example of the preview image in a case where printing is performed on the blue paper using the silver toner as the base.
Figure 9C:
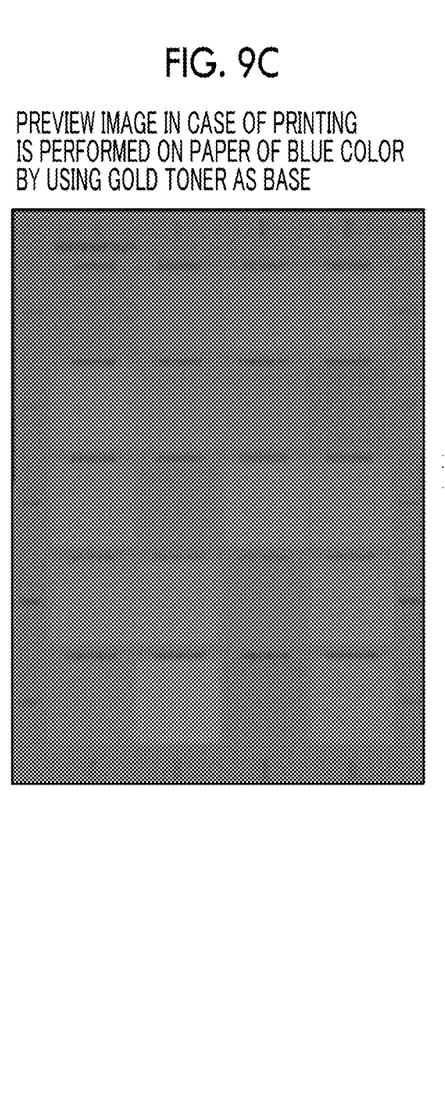
FIG. 9C shows an example of the preview image in a case where printing is performed on the blue paper using a gold toner as the base.

FIGS. 9A to 9C are diagrams showing examples of the display of the preview image in a case where the spot color is used. FIG. 9A shows an example of the preview image in a case where printing is performed on the white paper using the silver toner as a base, FIG. 9B shows an example of the preview image in a case where printing is performed on the blue paper using the silver toner as the base, and FIG. 9C shows an example of the preview image in a case where printing is performed on the blue paper using a gold toner as the base.

Also in the case of FIGS. 9A to 9C, it is assumed that the same color chart as in FIGS. 8A and 8B is printed on the paper.

In the case of FIG. 9A, the paper has a white color, but the layer of the silver toner is formed as a base for each color patch. Therefore, the color patch in the third row and the fourth column is observed as a light yellow color. The other color patches are also displayed in light colors as a whole as compared with FIG. 8A.

In the case of FIG. 9B, the paper has a blue color. In this case, the color between FIGS. 8A and 8B is displayed as the preview image under the effect of the density value of the silver toner. In the example of FIG. 9B, the color patch in the third row and the fourth column is displayed as yellowish green.

In the case of FIG. 9C, the paper also has a blue color, but the gold toner is used as the metallic color. Therefore, the appearance of the preview image is different from a case where silver toner is used.

SUMMARY

As described above, in the present exemplary embodiment, attention is paid to the property that the component of light incident on the surface of the printed matter is reflected by a metallic color toner layer.

Also, attention is paid to a fact that the higher the density value of the metallic color toner, the more the reflection component of the metallic color increases even in a case of the same reflection coefficient, and the effect of the component reflected by the metallic color is larger than the effect of the component reflected by the paper in the preview image.

As a result, it is possible to generate the preview image, in which the color tone is close to the color tone actually observed in a case where the image of the document data is printed on the non-white colored paper using the metallic color as the base.

Other Exemplary Embodiments (1) Although the exemplary embodiment of the present invention has been described above, the technical scope of the present invention is not limited to the scope described in the above-described exemplary embodiments. It is clear from the description of the claims that the above-described exemplary embodiment with various modifications or improvements is also included in the technical scope of the present invention.

(2) In the above-described exemplary embodiment, the case has been described where the ratio of the component of light reflected by the metallic color layer, which is the first component, to the component of light reflected by the surface of the paper, which is the second component, is determined by a which is a multiplication value of the reflection coefficient of the metallic color and the density value of the metallic color. The ratio of the first component to the second component may be determined by using the area ratio in which the metallic color covers the surface of the paper.

(3) In the above-described exemplary embodiment, the control device 40 (see FIG. 1) is disposed at the upper part of the housing of the printing device 20 (see FIG. 1), but may be realized as an independent information processing apparatus, for example, a server, connected through a network or a signal line.

(4) In the above-described exemplary embodiment, the toner is exemplified as an example of the metallic color material, but the color material may be ink.

(5) In the above-described exemplary embodiment, the silver color and the gold color are exemplified as the metallic color, but metallic red, metallic blue, metallic green, metallic pink, and the like may be used.

(6) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer, which reproduces a color tone of a printed matter and displays the color tone on a screen before printing, to realize:
a function of generating an image in which the color tone of the printed matter is reproduced based on a first component reflected by a metallic color material and a second component transmitted through the color material and reflected by paper.

2. The non-transitory computer readable medium storing a program according to claim 1,
wherein the function of generating the image includes combining the first component and the second component at a ratio corresponding to a magnitude of a density value of the color material, and generating the image.

3. The non-transitory computer readable medium storing a program according to claim 2,
wherein the function of generating the image includes making a ratio of the second component inversely proportional to the magnitude of the density value of the color material.

4. The non-transitory computer readable medium storing a program according to claim 3,
wherein the function of generating the image includes adding the first component and the second component at a ratio of $\alpha:1-\alpha$ in a case where a value, which is obtained by multiplying a reflection coefficient of the color material by the density value, is denoted by $\alpha$.

5. The non-transitory computer readable medium storing a program according to claim 1,
wherein the function of generating the image includes setting a ratio of the second component according to an area ratio of the color material covering a surface of the paper.

6. The non-transitory computer readable medium storing a program according to claim 1,
wherein the color material is a toner that forms a layer on a surface of the paper.

7. The non-transitory computer readable medium storing a program according to claim 1,
wherein the paper is non-white paper.

8. An information processing apparatus comprising:
a processor configured to:
generate an image in which a color tone of a printed matter is reproduced based on a first component reflected by a metallic color material and a second component transmitted through the color material and reflected by paper.

9. An information processing method comprising:
generating an image in which a color tone of a printed matter is reproduced based on a first component reflected by a metallic color material and a second component transmitted through the color material and reflected by paper.

* * * * *